(12) United States Patent
Jäger (10) Patent No.: US 7,179,043 B2
(45) Date of Patent: Feb. 20, 2007

(54) MANIPULATING ARRANGEMENT AND CELL

(75) Inventor: Helmut F. Jäger, Königsbach-Stein (DE)

(73) Assignee: Felsomat GmbH & Co., KG, Königsbach-Stein (DE)

( * ) Notice: Subject to any disclaimer, the term of this patent is extended or adjusted under 35 U.S.C. 154(b) by 127 days.

(21) Appl. No.: 10/854,734

(22) Filed: May 26, 2004

(65) Prior Publication Data

US 2005/0019145 A1    Jan. 27, 2005

(30) Foreign Application Priority Data

May 28, 2003 (DE) ................... 103 25 394
Oct. 10, 2003 (DE) ................... 103 48 223
Apr. 3, 2004 (EP) ................... 04008176

(51) Int. Cl.
*B65H 29/00* (2006.01)

(52) U.S. Cl. ............ 414/739; 414/222.01; 414/222.07; 414/225.01; 414/226.02; 901/31; 901/6; 483/901

(58) Field of Classification Search ........... 414/222.01, 414/222.07, 225.01, 226.02, 739, 729; 901/6, 901/41, 31; 483/901, 14–15, 16, 30–32, 483/34–36, 38; 29/33 P, 563; 409/201, 409/159, 202, 212

See application file for complete search history.

(56) References Cited

U.S. PATENT DOCUMENTS

| 4,082,018 | A | * | 4/1978 | Russell et al. ................ 82/124 |
| 4,439,090 | A | * | 3/1984 | Schaefer ..................... 414/736 |
| 4,844,678 | A | * | 7/1989 | Schenk ................... 414/223.01 |
| 4,984,351 | A | * | 1/1991 | Matsuyama et al. ........... 483/4 |
| 4,999,895 | A | * | 3/1991 | Hirose et al. ............... 29/33 P |
| 6,254,317 | B1 | * | 7/2001 | Chang ........................ 408/1 R |
| 6,357,094 | B1 | * | 3/2002 | Sugimoto ................... 29/27 C |
| 6,719,506 | B2 | * | 4/2004 | Chang et al. ............... 409/201 |
| 7,101,137 | B2 | * | 9/2006 | Schwarz et al. ....... 414/222.01 |
| 2005/0036879 | A1 | * | 2/2005 | Jhaveri et al. ........... 414/751.1 |

FOREIGN PATENT DOCUMENTS

| DE | 44 31 359 C1 | 5/1996 |
| DE | 19628556 | 1/1998 |
| DE | 19642042 A1 * | 4/1998 |
| DE | 101 02 413 C1 | 1/2002 |
| EP | 0 721 821 A2 | 7/1996 |
| JP | 58216833 | 12/1983 |

\* cited by examiner

*Primary Examiner*—Erica Cadugan
(74) *Attorney, Agent, or Firm*—Henneman & Associates, PLC; Larry E. Henneman, Jr.

(57) ABSTRACT

A manipulating arrangement having a horizontal portal on which a slide is horizontally traversable, an arm being pivotably mounted on the slide about a pivot axis which runs parallel to the portal, and a gripper for at least one of workpieces and tools being arranged on the end of the arm. The slide has an elongated support, on which a further slide is mounted in a vertically traversable manner, and the arm is pivotably mounted on the further slide.

28 Claims, 6 Drawing Sheets

MANIPULATING ARRANGEMENT AND CELL

FOREIGN PRIORITY

This application claims the right of foreign priority to Application No. 103 25 394.7 filed in Germany on May 28, 2003, and to Application No. 103 48 223.7 filed in Germany on Oct. 10, 2003, and to Application No. 04 008 176.2 filed in Europe on Apr. 3, 2004, by the same inventor, which are incorporated herein by reference in their entirety.

BACKGROUND OF THE INVENTION

The present invention relates to a manipulating arrangement having a horizontal portal on which a slide is horizontally traversable, an arm being pivotably mounted on the slide about an axis which runs parallel to the portal, and a gripper for workpieces being arranged on the end of the arm.

The present invention also relates to a manipulating cell having a framework and a manipulating arrangement of said type.

Such manipulating arrangements are known. In these manipulating arrangements, an arm is pivotably mounted on the slide in order thus to be able to swing workpieces and/or tools into a machine tool.

It is also known for a buckling-arm robot which has five axes to be arranged in a suspended manner on a slide of a portal.

Furthermore, it is known to mount an arm in a vertically movable manner on a slide of a horizontal portal. A gripper is provided on the bottom end of the vertically movable arm in order to be able to reach into a machine tool from above. In this case, a lateral extension for the gripper may also be provided on the bottom end of the vertically movable arm.

The object of the invention is to specify a manipulating arrangement which, with small overall height and little design outlay, enables workpieces and/or tools to be moved to a considerable extent in a direction transversely to the extent of the horizontal portal. For example, the manipulating arrangement, with small overall height and little design outlay, is to be capable of reaching deep into a lateral opening of a machine tool.

SUMMARY OF THE INVENTION

In the case of the manipulating arrangement mentioned at the beginning, this object is achieved by the slide having an elongated support, on which a further slide is mounted in a vertically traversable manner, and by the arm being pivotably mounted on the further slide.

The above object is also achieved by a manipulating cell with such a manipulating arrangement.

Due to the provision of an elongated support having a further slide, it is possible to considerably extend the reach of the arm. The "vertical" traversability of the further slide is to be understood in such a way that at least one component movement of the traversability is vertical. In addition, in contrast to purely vertically traversable arms on horizontally traversable slides, only a small overall height is necessary. In other words, it is not necessary for the arm to extend upward beyond the horizontal portal.

Furthermore, the arm may be oriented in alignment with the support, so that the arrangement of support and arm can also be traversed in the horizontal direction through narrow openings.

The elongated support preferably extends in the vertical direction.

In this way, a large working area or a large reach in the vertical direction can be achieved. Furthermore, the manipulating arrangement may be of narrow design in the horizontal direction.

According to a preferred embodiment, the vertical support extends downward from the portal.

In particular a small overall height is realized as a result. The manipulating arrangement permits a comparatively large vertical working area without the arm having to extend upward beyond the horizontal portal.

In an alternative preferred embodiment, the elongated support is inclined relative to the vertical.

In this case, at a given arm length, a larger working area can be achieved in the horizontal direction. On the whole, a good compromise can be achieved between the length of the horizontal working area and the vertical working area.

It is especially advantageous in this case if the inclined support is inclined in a plane which is essentially perpendicular to the pivot axis.

In this embodiment, the working area in the horizontal direction can extend especially far in a direction transversely to the pivot axis (or longitudinal axis of the horizontal portal). Consequently, transfer into deep lateral openings of a machine tool may also be effected.

According to a further preferred embodiment, a bottom end of the inclined support points toward a machine tool, to which workpieces and/or tools are transferred by means of the gripper.

The extension of the working area in the horizontal direction toward the machine tool is assisted even further by this measure.

Furthermore, it is advantageous if the support is inclined approximately by 45° to the vertical.

In this embodiment, an especially good compromise is achieved between a large working area in the horizontal direction and a large working area in the vertical direction.

It is also advantageous if a center region of the inclined support is secured to the slide.

In this way, the arrangement of slide and inclined support, despite its inclination, can be moved in the traverse direction of the horizontal portal through comparatively narrow openings.

In general, it is of course also conceivable for the support to be attached horizontally to the slide. In this embodiment, an especially large horizontal working area would be achieved, at the expense of the size of the working area in the vertical direction.

In a preferred embodiment of the invention, the length of the support corresponds essentially to the length of the arm.

In this embodiment, the arrangement of support and arm, if they are oriented in alignment with one another, can also be traversed through openings whose height corresponds to the length of the support. In this case, the reach of the arm may be up to twice the length of the support.

According to a further preferred exemplary embodiment, the gripper is rotatably mounted on the end of the arm about a gripper axis which is oriented parallel to the pivot axis of the arm.

In this embodiment, the position of the gripper is independent of the pivoted position of the arm. Workpieces and/or tools can therefore be traversed in the pivot plane of the arm in any desired directions and curves. This may be effected by a superimposition of the movement of the further slide on the support, pivoting of the arm and rotation of the gripper about the gripper axis.

Furthermore, it is advantageous in the manipulating cell according to the invention if the horizontal portal is arranged in the region of an end face of the framework of the manipulating cell.

In this arrangement, the manipulating cell can be positioned with its end face close to a machine tool, so that largely the full reach of the arm can be used.

In this case, it is especially advantageous if a projection, on which a guide rail of the horizontal portal is secured, is provided on the end face of the framework.

This measure enables the manipulating cell, with its end face, to be positioned even closer to a machine tool, it being possible for the projection in many cases to protrude above the machine tool. Furthermore, it is possible to keep the top side of the manipulating cell away from the guide rail, so that better accessibility is obtained, in particular during maintenance work.

According to a further embodiment preferred on the whole, the support is traversable inside the framework in direct proximity to an end face on which the horizontal portal is provided.

This measure ensures, on the one hand, that the support traverses close to the end face, so that the arm can extend far into a machine tool arranged adjacent to it. Furthermore, the remaining part of the space inside the manipulating cell is not taken up by the traverse path of the support. In this respect, better maintainability results. In addition, this enables the manipulating cell to be equipped with different types of transfer station. This promotes the modularity of the manipulating cell.

According to a further preferred embodiment, the horizontal portal, in its longitudinal direction, extends beyond the framework of the manipulating cell.

In this embodiment, the manipulating cell can be arranged more flexibly with regard to the machine tool, in particular laterally offset relative to the machine tool.

According to a further preferred embodiment, there is arranged in the framework a transfer station, from which workpieces and/or tools can be removed by means of the gripper or on which workpieces and/or tools can be deposited by means of the gripper.

In the simplest case, the transfer station may be a pallet with workpieces and/or tools. However, the transfer station may also be formed by one or more pallet stations, by conveyor belts, drawers or the like.

Thus, it is especially advantageous if the transfer station has at least one drawer which can be pulled out and/or in by the gripper or a driver arranged on the gripper (or on the end of the arm).

In this way, the functionality of the arm is extended to the effect that said arm is also used to move a drawer into a suitable transfer position. This facilitates the loading and unloading of the drawers, namely when said drawers are arranged in a loading or unloading position.

Furthermore, it is especially advantageous in this case if the drawer can be pulled out or in in a direction perpendicular to the extent of the horizontal portal by means of the gripper or the driver provided thereon.

In this way, the sliding direction of the drawer is oriented approximately with the pivot plane of the arm, so that the arm, from the design point of view, can be used especially favorably for pulling the drawer in and/or out.

Furthermore, it is advantageous if the transfer station has at least two pallet stations arranged next to one another in a direction parallel to the extent of the horizontal portal.

In this arrangement, for example, one pallet station can be assigned for the feeding of parts and the other pallet station can be assigned for the discharge of parts.

In this case, it is especially advantageous if a pallet rest mounted so as to be movable parallel to the extent of the horizontal portal is traversable by means of the gripper or a driver provided thereon (or on the arm).

This enables a pallet to be shifted from a pallet station onto the pallet rest and enables it to be assigned to both the one and the other pallet station. This makes it easier to exchange complete pallet stacks in the pallet stations without disturbing the work flow of the manipulating cell during the feeding and discharge of tools or workpieces to and from the machine tool.

In general, the manipulating cell according to the invention has an overall height which preferably does not extend beyond the height of the portal in any operating state. Nonetheless, it is also the case that the pivotable arm traversable vertically or in an inclined manner via the further slide can extend deep into a machine tool.

Only three axes are required for this, namely the linear axis for the traverse of the further slide, the rotation axis for pivoting the arm on the further slide, and the rotation axis for pivoting the gripper. There is also the horizontal portal axis, on which the slide is horizontally traversable.

Furthermore, it is especially preferred if electric motors provided for pivoting the arm and for pivoting the gripper are provided on the further slide. The mass of the arm can be reduced as a result.

It goes without saying that the abovementioned features and the features still to be explained below can be used not only in the respectively specified combination but also in other combinations or on their own without departing from the scope of the present invention.

BRIEF DESCRIPTION OF THE DRAWINGS

Exemplary embodiments of the invention are shown in the drawing and are described in more detail below. In the drawing.

DETAILED DESCRIPTION OF PREFERRED EMBODIMENTS

Figure 1:
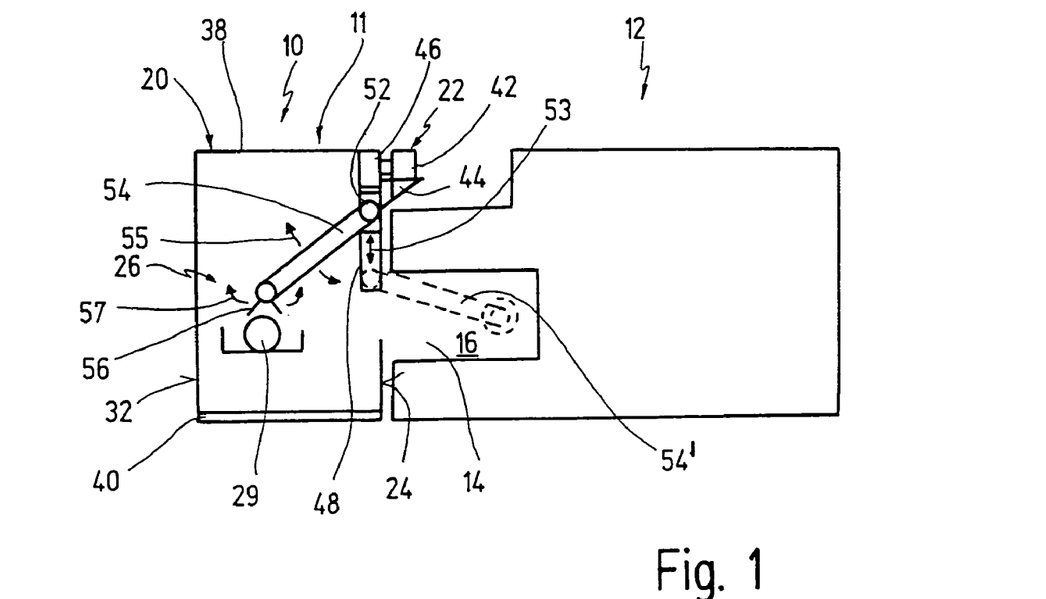
FIG. 1 shows a schematic side view of an arrangement consisting of a manipulating cell according to the invention and a machine tool.
Figure 2:
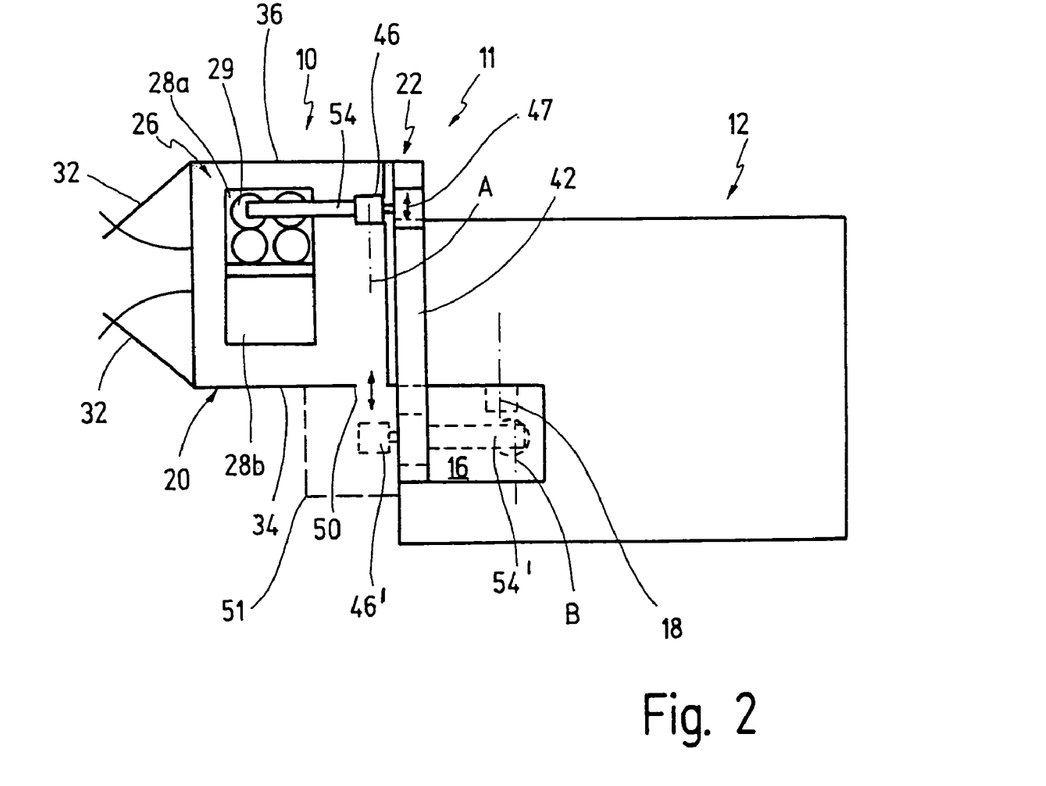
FIG. 2 shows a plan view of the arrangement shown in FIG. 1.

A manipulating cell according to the invention is designated overall by 10 in FIGS. 1 and 2.

The manipulating cell 10 has a manipulating arrangement 11 and is assigned directly to a machine tool 12 which has a lateral opening 14 toward a machining space 16 inside the machine tool 12.

The manipulating cell 10 has a framework 20 of conventional type of construction, as a rule a frame of welded or fitted-together metal profiles. Furthermore, the framework 20, except for the requisite openings and doors, is as a rule fully lined in order to comply with the normal industrial safety regulations.

A horizontal portal 22 of the manipulating arrangement 11 is provided on the top side of the framework 20 and extends approximately parallel to an end face 24 of the framework 20. The end face 24 is turned toward the machine tool 12.

The manipulating cell 10 serves for the automated feeding of workpieces and/or tools to the machine tool 12.

Every reference hereinafter to the feeding and discharge, respectively, of workpieces is to equally apply to the feeding and discharge of tools in order to simplify the vocabulary.

For the buffering of the feeding and discharge of workpieces, a transfer station 26 is provided in the manipulating cell 10.

In the embodiment shown according to FIGS. 1 and 2, the transfer station 26 has two pallet stations 28a, 28b arranged next to one another. One pallet station (e.g. 28a) contains a stack of pallets, on which workpieces 29 each to be fed to the machine tool 12 are arranged. The other pallet station (e.g. 28b) likewise has a stack of pallets which lie one on top of the other and on which workpieces machined by the machine tool 12 can be deposited.

The pallet stacks of the pallet stations 28a, 28b can be removed from or inserted into the manipulating cell via a door 32 (which in the present exemplary embodiment is of two-leaf design). The door 32 is provided on the side opposite the end face 24, but may also be arranged on one of two side walls 34, 36.

The top side of the manipulating cell 10 is closed by a cover 38 (removable as a rule). The manipulating cell 10 rests on a rigidly anchored base 40.

The horizontal portal 22 has a guide rail 42 which runs parallel to the end face 24. The guide rail 42 is arranged on a projection 44 which extends from the end face 24 toward the machine tool 12. As shown in FIG. 1, the projection 44 can protrude at least partly above the machine tool 12 in order to be able to arrange the end face 24 as close to the opposite side of the machine tool 12 as possible.

On the guide rail 42, a slide 46 of the manipulating arrangement 11 is traversable in the horizontal direction parallel to the end face 24. The direction of movement of the slide 42 is shown at 47.

A vertical support 48 extends rigidly downward from the slide 46.

In the present case, the manipulating cell 10, as can be seen in FIG. 2, is arranged so as to be offset relative to the machining space 16 parallel to the direction of movement 47.

The guide rail 42 therefore extends beyond the framework 20, to be more precise beyond the side wall 34, so that the slide 46 can be positioned opposite the machining space 16.

For the purpose of inserting the vertical support 48 into the interior space of the manipulating cell 10, an opening 50 is provided in the side wall 34. The vertical support 48 is guided by the slide 46 in such a way that it traverses in direct proximity to the end face 24 in the interior of the manipulating cell 10. Shown schematically at 51 is a protective wall which closes the space in front of the machine tool including the opening 50.

A further slide 52 is mounted on the vertical support 48 in a traversable manner in the vertical direction. The direction of movement of the further slide 52 is shown at 53.

An arm 54 is pivotably mounted on the further slide 52 in a pivot plane which is oriented perpendicularly to the direction of movement 47 of the slide 46. The rotation axis of the arm 54 on the further slide 52 is schematically indicated at A in FIG. 2. The direction of movement of the arm 54 is shown at 55 in FIG. 1.

A gripper 56 is arranged on the free end of the arm 54. The gripper 56 is likewise designed to be pivotable or rotatable, to be precise about a rotation axis B which is oriented parallel to the rotation axis A.

To pick up a workpiece 29 which is available at the pallet station 28a, the slide 46 is traversed in such a way that the arm 54 is arranged opposite the target workpiece 29. The workpiece 29 is then seized by a superimposed movement of further slide 52, arm 54 and gripper 56 and lifted from the pallet station 28a. The arm 54 is then oriented with the vertical support 48, and the slide 46 traverses toward the machining space 16. In the process, the further slide 52 may also be traversed in a suitable manner. It goes without saying that these movements in turn may be superimposed.

After passing through the opening 50, the further slide is traversed downward and the arm 54 is swung into the machining space 16. This position is shown by broken lines in FIGS. 1 and 2. In the machining space, the workpiece 29 can be transferred to the machining spindle 18.

In the opposite sequence, a workpiece machined in the machine tool 12 is received by the gripper 56 in the position shown by broken lines in FIGS. 1 and 2 and is brought into the manipulating cell, where it is deposited on the other pallet stack 28b.

Due to the fact that the arm 54 and the gripper 56 are pivotably mounted in parallel planes, it is possible to position the gripper 56 in such a way that the latter can pick up and put down workpieces 29 in the correct position and can transfer them to the spindle 18 in the correct position.

Due to a superimposed movement of the further slide 52, of the arm 54 and of the gripper 56, the workpieces 29 can be traversed in a plane perpendicularly to the traverse axis 47 along any desired curve or path.

The drive for pivoting the arm 54 and the drive for pivoting the gripper 56 may be uncoupled drives which are separate from one another. To simplify the complexity of the design, however, said drives may also be coupled.

It goes without saying that the drives for the slide 56, the further slide 52, the arm 54 and the gripper 56 are moved in a coordinated manner with one another by means of a suitable control. The control may be, in particular, a numerical control such as a stored-program control.

Instead of an offset arrangement of the manipulating cell 10 relative to the machining space 16, it is also possible to provide an appropriate aperture on the end face 24 and to position the manipulating cell 10 directly in front of the machine tool 12.

The transfer station 26 may be designed in many different ways. Instead of pallet stations 28a, 28b, other measures for providing or discharging workpieces may also be provided. In the simplest case, the transfer station 26 may be a simple pallet. However, the transfer station provided may also be a conveyor belt which runs through the manipulating cell 10 or is directed past a side wall (for example side wall 36) or that wall on the manipulating cell 10 which is opposite the end face 24.

It can be seen that the manipulating cell 10 has only a small overall height, which may be approximately equal to that of the machine tool 12.

Nonetheless, due to the superimposition of the movement of the further slide 52 and the pivoting movement 55 of the arm 54, it is possible to reach deep into a machining space 16 of the machine tool 12. The reach into the machine tool is essentially determined by the length of the arm 54 and by the distance of the vertical support 48 from the machine tool 12.

Figure 3:
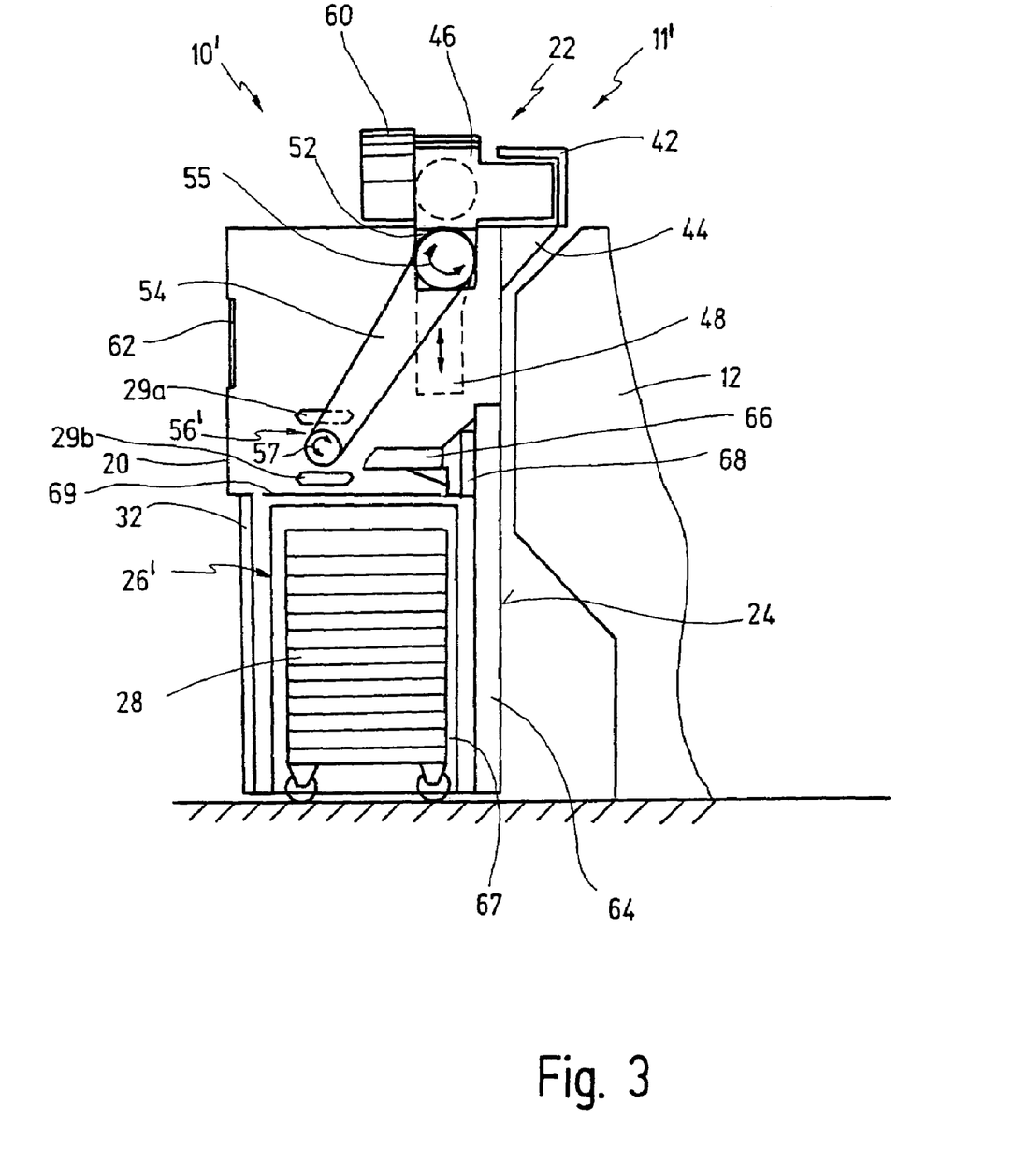
FIG. 3 shows a schematic side view of an arrangement consisting of a manipulating cell according to a further embodiment of the invention and a machine tool.
Figure 4:
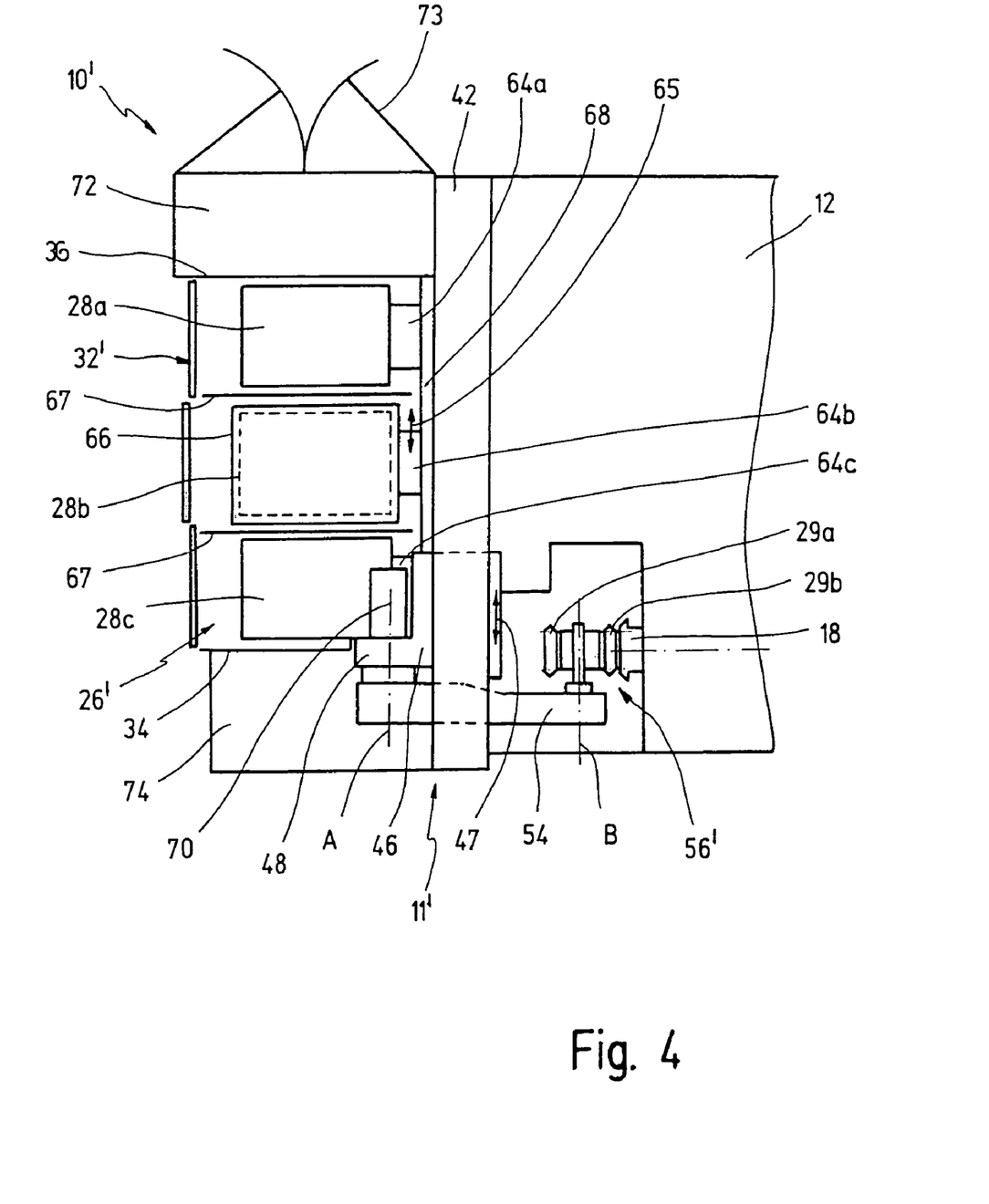
FIG. 4 shows a plan view of the arrangement in FIG. 3.

A further embodiment of a manipulating cell according to the invention is designated overall by 10' in FIGS. 3 and 4.

The general functioning of the manipulating cell 10' corresponds to that of the manipulating cell 10 in FIGS. 1 and 2. Therefore only the differences in this respect will be dealt with below.

Thus, shown first of all in FIG. 3 is a trailing cable 60 which serves for the electrical supply of the motors for the further slide 52, the arm 54 and the gripper 56. In this case, the trailing cable 60 is arranged on that side of the slide 46 which is opposite the guide rail 42.

Furthermore, a window 62 in that wall of the manipulating cell 10 which is opposite the end face 24 is shown in FIG. 3. An operator can monitor the proper functioning of the manipulating cell and also the current loading state of the transfer station, which is designated by 26' in FIGS. 3 and 4, through the window.

As can be seen in particular from FIG. 4, the transfer station 26' has three pallet stations 28a, 28b, 28c arranged next to one another. Assigned to each of the pallet stations 28a, 28b, 28c is a vertical axis 64, by means of which the pallets of the respective pallet stations can be moved vertically. The corresponding vertical axes are designated by 64a, 64b and 64c, respectively, in FIG. 4.

Furthermore, the transfer station 26' has a pallet rest 66 which can be moved along a horizontal axis 68 parallel to the direction of movement 47, as shown schematically at 65. In FIG. 3, for reasons of clarity, the pallet rest 66 is shown adjacent to the end face 24. As a rule, however, said pallet rest 66 is arranged adjacent to the opposite front side or is mounted there.

Due to the horizontal mobility, the pallet rest 66 can be assigned to each of the three pallet stations 28a, 28b, 28c (in FIG. 4 it is assigned to the center pallet station 28b).

Due to the horizontally displaceable pallet rest 66, the work flow of the manipulating cell 10' can be uncoupled from the loading and unloading of the pallet stations 28a, 28b, 28c. In the position shown in FIG. 4, it is possible, for example, for the manipulating cell 10' to remove workpieces from the pallet rest 66 assigned to the pallet station 28b, or to deposit workpieces on said pallet rest 66, in which case the pallet stack lying underneath of the pallet station 28b can be exchanged.

Furthermore, in the case of the manipulating cell 10', a bulkhead partition 67 and a "tunnel" 69, which is movable in the horizontal direction, are in each case provided between the pallet stations 28.

The tunnel 69 has the width of a pallet station 28. By the tunnel 69 being run over a pallet station, this pallet station is partitioned off from the remaining work space of the manipulating cell 10' and the other pallet stations 28. Consequently, an operator, for example, can run a pallet stack into such a partitioned-off pallet station or can remove it from the latter, while at the same time the manipulating arrangement 11', inside the framework 20 of the manipulating cell 10', removes workpieces from the other pallet stations or deposits them thereon.

For the sake of clarity, the tunnel 69 is not shown in FIG. 4. As a rule, however, it is designed to be movable in the horizontal direction independently of the pallet rest 66.

It can be seen in the representation of FIG. 4 that the door 32' is designed as a three-leaf sliding door.

It can also be seen from FIG. 4 that a motor 70 is secured to the slide 46. The motor 70 may be used for driving the further slide 52, for driving the arm 54 about the rotation axis A and/or for driving the gripper 56'. Due to the mounting on the slide 46, the movable parts such as the further slide 52 and the arm 54 can be designed with a smaller mass, so that higher dynamics can be achieved overall.

It is also shown in FIGS. 3 and 4 that the gripper 56' is designed as a double gripper.

In this embodiment, it is consequently possible to use a working stroke simultaneously for removing a workpiece 29b from the spindle 18 of the machine tool 12 and for transferring a further workpiece 29a to this spindle 18.

A control cabinet 72, which has a door 73 for maintenance purposes, is provided on the outside of the side wall 36.

Provided on the opposite side wall 34 is a further station, in the present case a de-oiling station 74, in which workpieces 29 which come back from the machining from the machine tool 12 can first of all be de-oiled before they are transferred to the transfer station 26'.

Figure 5:
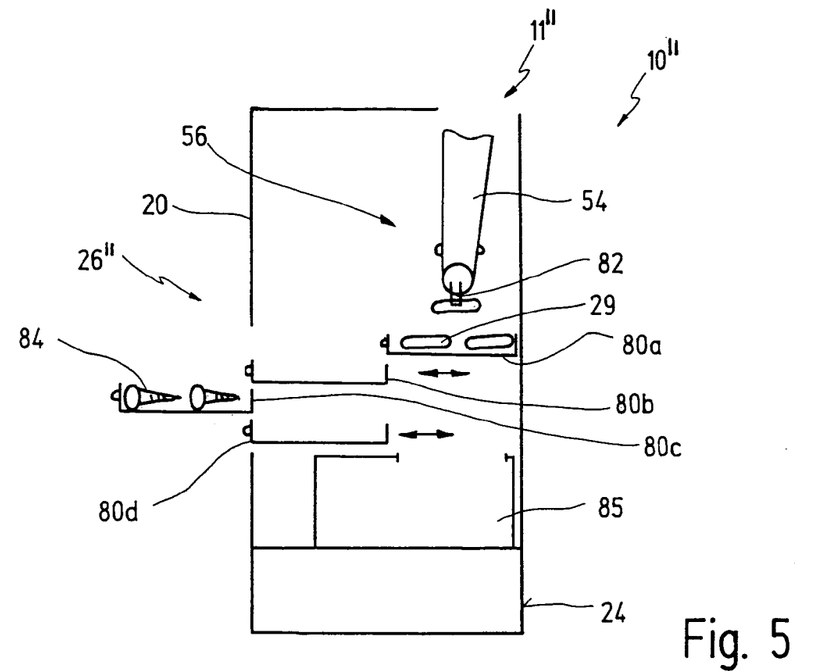
FIG. 5 shows a schematic side view of a further embodiment of the manipulating cell according to the invention.
Figure 6:
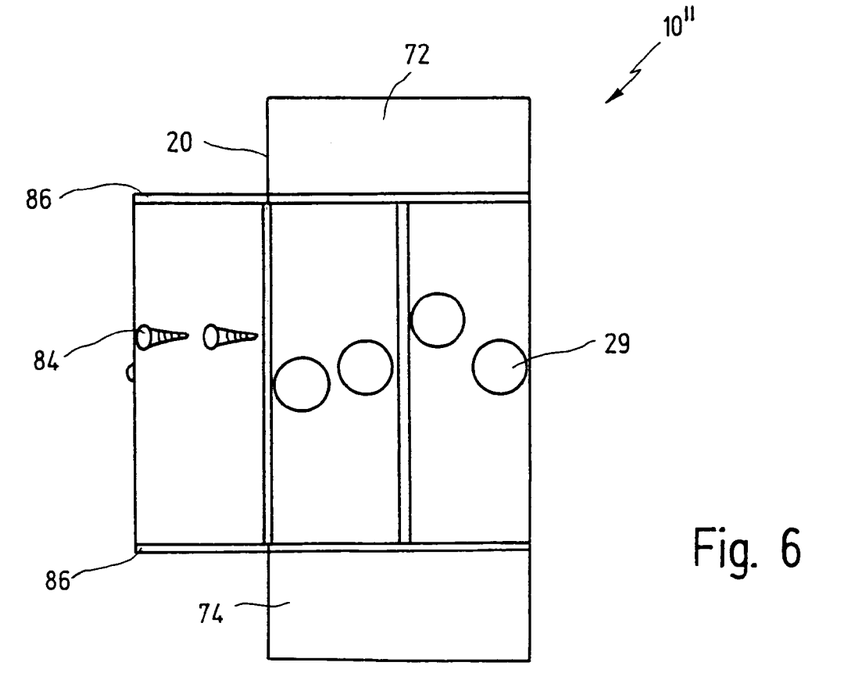
FIG. 6 shows a plan view of the manipulating cell in FIG. 5.

A further embodiment of a manipulating cell according to the invention is designated overall by 10" in FIGS. 5 and 6.

The design and the general functioning of the manipulating cell 10" correspond to that of the manipulating cells 10 and 10', respectively, in FIGS. 1 to 4. Only the differences will be dealt with below.

The manipulating cell 10" has a further embodiment of a transfer station 26".

The transfer station 26" has a plurality of drawers 80a, 80b, 80c, 80d arranged one above the other. The drawers 80 are traversable in a direction perpendicular to the traverse direction 47 of the slide 46.

FIG. 5 shows that, of the four drawers, two drawers 80b and 80c are located in a basic position. The drawer 80c is in a loading position, in which it projects relative to the framework 20 of the manipulating cell 10". In this position, the drawers 80 can be loaded and unloaded manually.

On the other hand, the topmost drawer 80a, in the representation in FIG. 5, is pulled out relative to the basic position toward the end face 24. In this position, the workpieces lying on the drawer 80a can be removed, to be precise by means of the gripper 56.

Furthermore, a driver 82 which is designed for actuating the drawers 80 is provided on the gripper 56. Consequently, when the drawer 80a has been processed, it could be shifted back into the basic position again by means of the driver 82 and then a further drawer (for example 80b) could be pulled out in order to then remove workpieces from this drawer.

When all the drawers 80 are located in the basic position (on the left in FIG. 5), access can be gained to a measuring station 85 arranged below the drawers 80. As a result, for example, workpieces which are to be measured in the course of a quality inspection after their machining are first of all measured in order to then be deposited on one of the drawers 80.

It goes without saying that a driver 82 can be used in the same manner to move the pallet rest 66 and/or the tunnel 69 of the manipulating cell 10' in FIGS. 3 and 4 in the horizontal direction. In this way, it is possible to dispense with separate drives for these axes.

Alternatively, it is also possible for the drawers 80 to be actuated by a separate actuator system, for example by means of electric motor or on a pneumatic basis.

Furthermore, FIG. 6 shows that lateral guides 86 may extend from the framework 20, these guides 86 serving to guide the drawers 80 into the loading position when being pulled out of the basic position.

Figure 7:
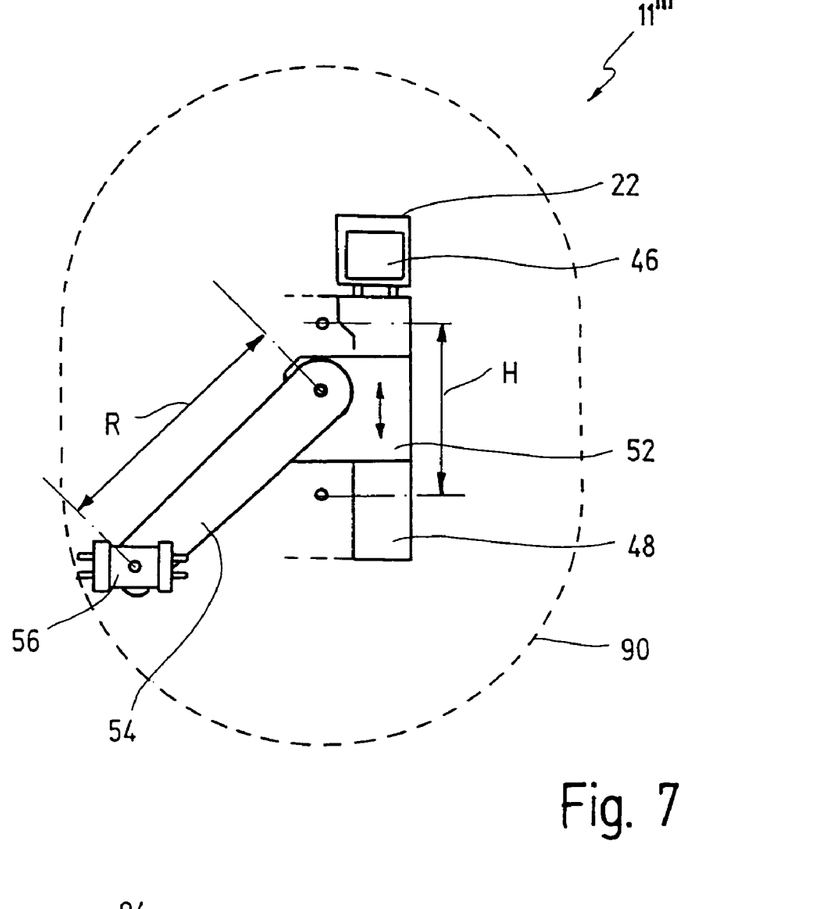
FIG. 7 shows a schematic representation of the working area of a manipulating arrangement according to the invention.

FIG. 7 schematically shows a further embodiment of a manipulating arrangement 11''' according to the invention. In this manipulating arrangement 11''', the rotation axis for the arm 54 is provided laterally on the slide 52. Also shown schematically in FIG. 7 is the spatial coverage 90 which can be realized with the manipulating arrangement 11''' according to the invention (also with the other manipulating arrangements which are shown in the previous figures). The area of the spatial coverage 90 has essentially the width 2 R in the lateral direction, where R is the length of the arm 54.

In the vertical direction, the area of the spatial coverage 90 extends over at most 2 R+H, where H is the stroke of the further slide 52 on the vertical support 48. In this case, it goes without saying that, of the area of the spatial coverage 90, possibly certain sections are blocked by the horizontal portal 42 or the like. At any rate, it can be seen that a large spatial coverage 90 can be achieved with a relatively compact arrangement and comparatively small masses.

Figure 8:
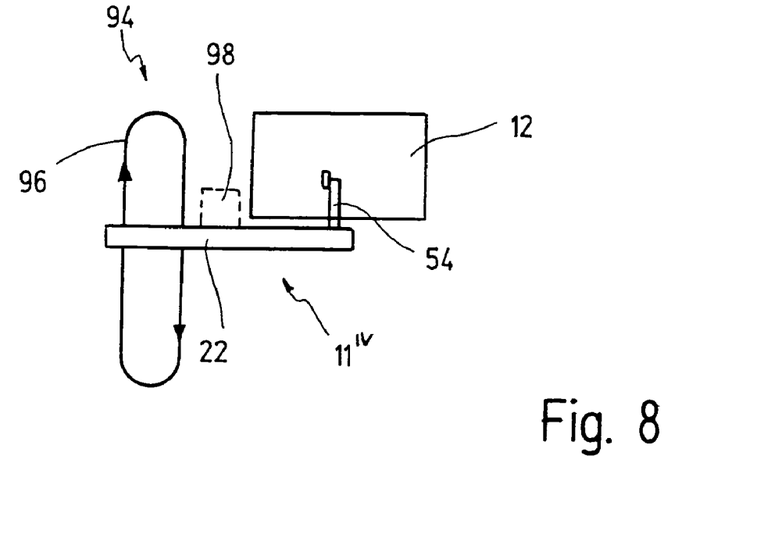
FIG. 8 shows a plan view of a further embodiment of a manipulating arrangement according to the invention.

FIG. 8 shows a further embodiment of a manipulating arrangement 11$^{IV}$ according to the invention. A framework of a manipulating cell is not assigned to the manipulating arrangement 11$^{IV}$. On the contrary, the manipulating arrangement 11$^{IV}$ is provided directly for connection between a machine tool 12 and a conveyor system 94 for feeding and discharging workpieces. The conveyor system 94 may have, for example, a conveyor belt 96 or a plurality of conveyor belts.

A further station such as a measuring station, as shown schematically at 98 in FIG. 8, may be arranged between the machine tool and the conveyor system 94.

Figure 9:
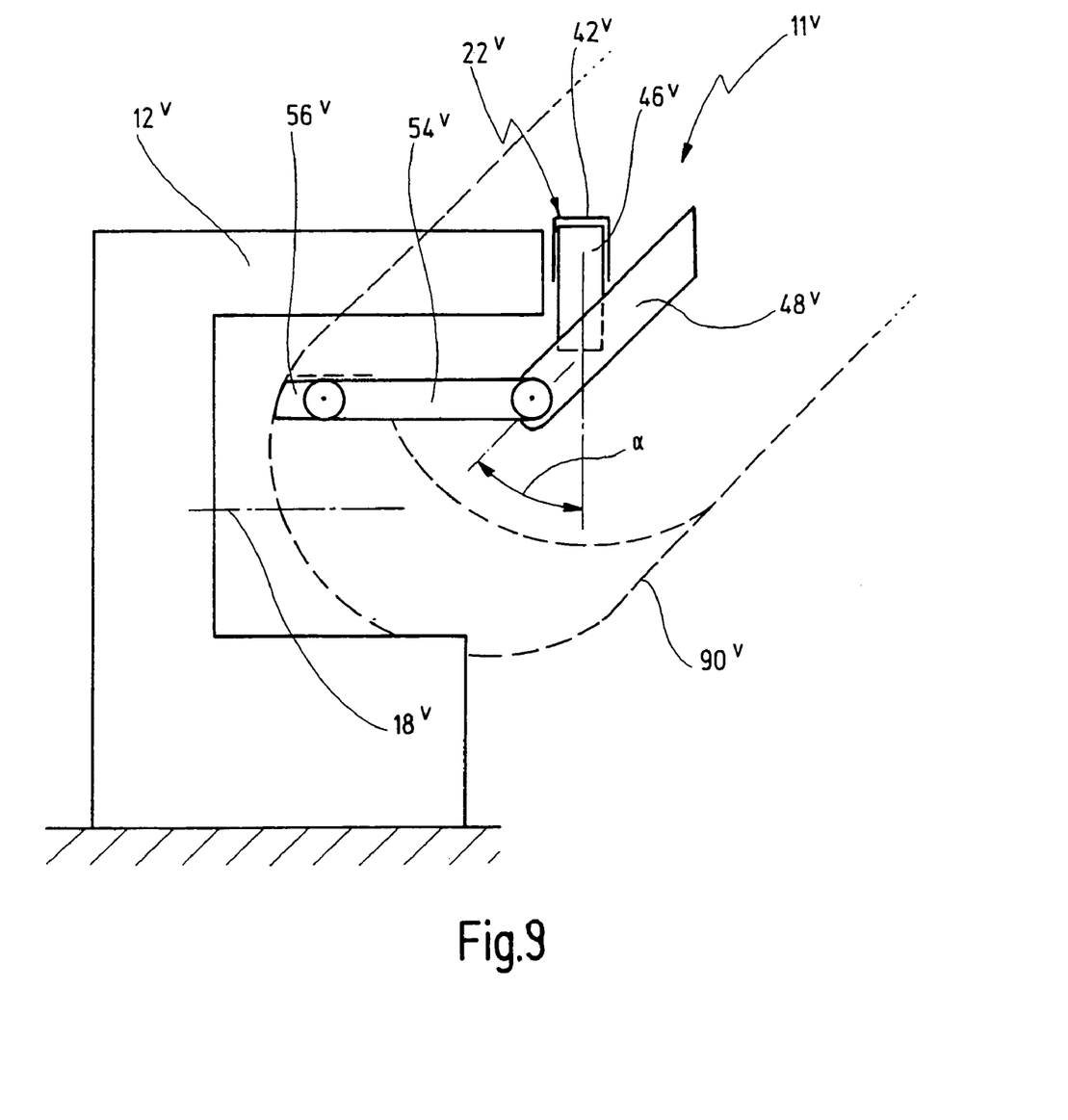
FIG. 9 shows a schematic side view of a further embodiment of the manipulating arrangement according to the invention with an inclined support.

A further embodiment of the manipulating arrangement according to the invention is designated overall by 11$^V$ in FIG. 9.

In its general construction and its general functioning, the manipulating arrangement 11$^V$ is similar to the embodiments of manipulating arrangements according to the invention which are described above. Elements corresponding to one another are therefore designated by the same reference numerals, the index "V" being provided for differentiation.

The description of the construction and of the functioning of the manipulating arrangements according to the invention of the abovementioned embodiments can be applied to the manipulating arrangement 11$^V$ to the same extent. Only the differences will be dealt with below.

A support 48$^V$ is rigidly attached to the slide 46$^V$ of the horizontal portal 22$^V$. The support 48$^V$ is not oriented vertically like the supports of the previous embodiments. The support 48$^V$ is oriented inclined by an angle α relative to the vertical. The value of α may be within a range of between 0 and 90°, preferably within a range of between 10 and 70°. In the embodiment shown, the value α=45°.

In this case, the support 48$^V$ is inclined by the angle α to the vertical within a plane which is oriented perpendicularly to the traverse axis of the slide 46$^V$.

A center region of the elongated inclined support 48$^V$ is secured to the slide 46$^V$. Part of the support 48$^V$ therefore extends downward toward a machine tool 12$^V$ which is assigned to the manipulating arrangement 11$^V$. An opposite end of the support 48$^V$ extends obliquely upward from the slide 46$^V$. Since the slide 46$^V$ itself extends downward relative to a guide rail 42$^V$ of the horizontal portal 22$^V$, the rear part of the inclined support 48$^V$ essentially does not extend beyond the guide rail 42$^V$. In this embodiment too, therefore, a low overall height can be achieved.

The working area or spatial coverage 90$^V$ of the manipulating arrangement 11$^V$ with regard to the machine tool 12$^V$ is shown by 90$^V$ in FIG. 9.

On the whole, the spatial coverage 90$^V$ which can be achieved with the manipulating arrangement 11$^V$ is of course markedly larger. Compared with the spatial coverage 90 according to FIG. 7, the spatial coverage of the manipulating arrangement 11$^V$ is somewhat longer in the horizontal direction and (with otherwise comparable lengths of support and arm) somewhat shorter in the vertical direction. In short, the spatial coverage 90$^V$ is equal to the spatial coverage 90, only inclined by the angle α of the support 48$^V$.

I claim:

1. A workpiece manipulating arrangement having a horizontal portal on which a slide is horizontally traversable in a first direction, an arm and a gripper for at least one workpiece being arranged on the end of the arm, wherein the slide has an elongated support, on which a further slide is mounted in a traversable manner with a vertical movement component, the arm being pivotably mounted on the further slide about a pivot axis which runs parallel to the portal and the first direction, and wherein the gripper is rotatably mounted on the end of the arm about a gripper axis which is oriented parallel to the pivot axis of the arm.

2. The manipulating arrangement as claimed in claim 1, wherein the elongated support extends in the vertical direction.

3. The manipulating arrangement as claimed in claim 2, wherein the vertical support extends downward from the portal.

4. The manipulating arrangement as claimed in claim 1, wherein the elongated support is inclined relative to the vertical.

5. The manipulating arrangement as claimed in claim 4, wherein the inclined support is inclined in a plane which is oriented essentially perpendicularly to the pivot axis.

6. The manipulating arrangement as claimed in claim 4, wherein a bottom end of the inclined support points toward a machine tool, to which at least one workpiece is transferred by means of the gripper.

7. The manipulating arrangement as claimed in claim 4, wherein the inclined support is inclined approximately by 45° to the vertical.

8. The manipulating arrangement as claimed in claim 4, wherein a center region of the inclined support is secured to the slide.

9. The manipulating arrangement as claimed in claim 1, wherein the length of the support corresponds essentially to the length of the arm.

10. The manipulating arrangement as claimed in claim 1, wherein the gripper is designed for picking up and putting down workpieces.

11. A manipulating cell having a framework and a workpiece manipulating arrangement, the manipulating arrangement having a horizontal portal on which a slide is horizontally traversable in a first direction, an arm and a gripper for at least one workpiece being arranged on the end of the arm, wherein the slide has an elongated support, on which a further slide is mounted in a traversable manner with a vertical direction component, the arm being pivotably mounted on the further slide about a pivot axis which runs parallel to the portal and the fist direction, and wherein the gripper is rotatably mounted on the end of the arm about a gripper axis which is oriented parallel to the pivot axis of the arm.

12. The manipulating cell as claimed in claim 11, wherein the horizontal portal is arranged in the region of an end face of the framework of the manipulating cell.

13. The manipulating cell as claimed in claim 12, wherein a projection, on which a guide rail of the horizontal portal is secured, is provided on the end face of the framework.

14. The manipulating cell as claimed in claim 11, wherein the support is traversable inside the framework in direct proximity to an end face of the frame work on which the horizontal portal is provided.

15. The manipulating cell as claimed in claim 11, wherein the horizontal portal, in its longitudinal direction, extends beyond the framework of the manipulating cell.

16. The manipulating cell as claimed in claim 11, wherein there is arranged in the framework a transfer station, from which at least one workpiece can be removed by means of the gripper or on which at least one workpiece can be deposited by means of the gripper.

17. The manipulating cell as claimed in claim 16, wherein the transfer station has at least one drawer which can be at least one of pulled out and pulled in by the gripper or a driver arranged on the gripper.

18. The manipulating cell as claimed in claim 17, wherein the drawer can be pulled out or in in a direction perpendicular to the extent of the horizontal portal by means of the gripper or the driver provided thereon.

19. The manipulating cell as claimed in claim 16, wherein the transfer station has at least two pallet stations arranged next to one another in a direction parallel to the extent of the horizontal portal.

20. The manipulating cell as claimed in claim 19, wherein a pallet rest mounted so as to be movable parallel to the extent of the horizontal portal is traversable by means of the gripper or a driver provided thereon.

21. The manipulating cell as claimed in claim 11, wherein the elongated support extends in the vertical direction.

22. The manipulating cell as claimed in claim 21, wherein the vertical support extends downward from the portal.

23. The manipulating cell as claimed in claim 11, wherein the elongated support is inclined relative to the vertical.

24. The manipulating cell as claimed in claim 23, wherein the inclined support is inclined in a plane which is oriented essentially perpendicularly to the pivot axis.

25. The manipulating cell as claimed in claim 23, wherein a bottom end of the inclined support points toward a machine tool, to which at least one workpiece is transferred by means of the gripper.

26. The manipulating cell as claimed in claim 23, wherein the inclined support is inclined approximately by 45° to the vertical.

27. The manipulating cell as claimed in claim 23, wherein a center region of the inclined support is secured to the slide.

28. The manipulating cell as claimed in claim 11, wherein the length of the support corresponds essentially to the length of the arm.

* * * * *